US009032529B2

(12) United States Patent
Amit et al.

(10) Patent No.: US 9,032,529 B2
(45) Date of Patent: May 12, 2015

(54) DETECTING VULNERABILITIES IN WEB APPLICATIONS

(75) Inventors: Yair Amit, Hertzelyia (IL); Daniel Kalman, Hertzelyia (IL); Omer Tripp, Hertzelyia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/307,780

(22) Filed: Nov. 30, 2011

(65) Prior Publication Data

US 2013/0139266 A1 May 30, 2013

(51) Int. Cl.
*H04L 29/06* (2006.01)
*H04L 29/08* (2006.01)
*H04W 12/12* (2009.01)

(52) U.S. Cl.
CPC ............ *H04L 63/1433* (2013.01); *H04L 67/02* (2013.01); *H04W 12/12* (2013.01)

(58) Field of Classification Search
CPC .... H04L 63/1433; H04L 67/02; H04W 12/12
USPC ................................................ 726/22–25, 26
See application file for complete search history.

(56) References Cited

U.S. PATENT DOCUMENTS

| 7,703,127 | B2 | 4/2010 | Moran et al. | |
| 2006/0282494 | A1* | 12/2006 | Sima et al. | 709/200 |
| 2008/0047009 | A1* | 2/2008 | Overcash et al. | 726/23 |
| 2008/0120722 | A1* | 5/2008 | Sima et al. | 726/25 |
| 2009/0070869 | A1 | 3/2009 | Fan et al. | |
| 2009/0100518 | A1* | 4/2009 | Overcash | 726/22 |
| 2009/0193497 | A1* | 7/2009 | Kikuchi et al. | 726/1 |
| 2009/0282480 | A1* | 11/2009 | Lee et al. | 726/22 |
| 2011/0030060 | A1 | 2/2011 | Kejriwal | |
| 2011/0219446 | A1* | 9/2011 | Ichnowski | 726/22 |

OTHER PUBLICATIONS

Norvell, T., "A Short Introduction to Regular Expressions and Context Free Grammars," May 2005, 5 pages.*
Yasuhiko Minamide, "Static Approximation of Dynamically Generated Web Pages," International World Wide Web Conference Committee (IW3C2), May 10-14, 2005, Chiba, Japan, pp. 432-441.
Tripp et al., "TAJ: Effective Taint Analysis of Web Applications," PLDI'09, Jun. 15-20, 2009, Dublin Ireland; pp. 1-11.

* cited by examiner

*Primary Examiner* — Chau Le
(74) *Attorney, Agent, or Firm* — Holland & Knight LLP; Brian J. Colandreo, Esq.; Jeffrey T. Placker, Esq.

(57) ABSTRACT

A method, computer program product, and system for detecting vulnerabilities in web applications is described. A method may comprise determining one or more values associated with a web application that flow to response data associated with the web application. The one or more values may be modifiable by unreliable input. The method may further comprise generating a representation of the response data associated with the web application. The method may additionally comprise determining one or more potentially vulnerable portions of the response data based upon, at least in part, the one or more values modifiable by the unreliable input that flow to the response data associated with the web application, and the representation of the response data associated with the web application.

14 Claims, 5 Drawing Sheets

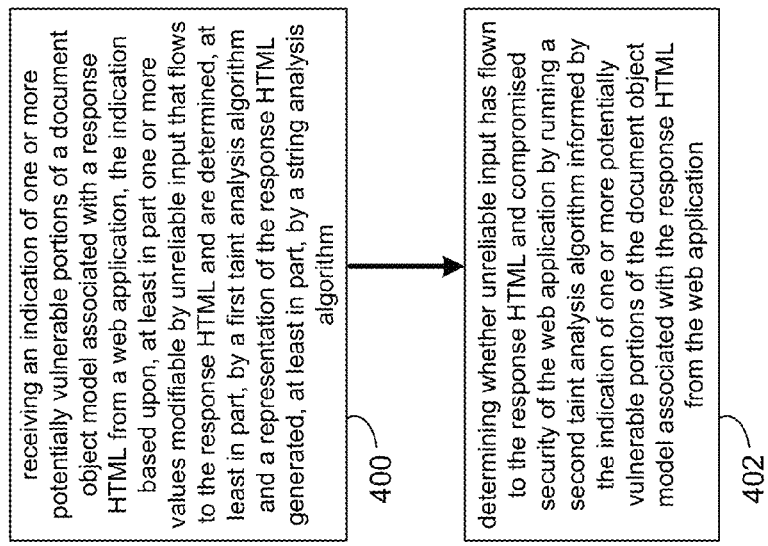

400 — receiving an indication of one or more potentially vulnerable portions of a document object model associated with a response HTML from a web application, at least in part based upon, the indication of one or more values modifiable by unreliable input that flows to the response HTML and are determined, at least in part, by a first taint analysis algorithm and a representation of the response HTML generated, at least in part, by a string analysis algorithm 402 — determining whether unreliable input has flown to the response HTML and compromised security of the web application by running a second taint analysis algorithm informed by the indication of one or more potentially vulnerable portions of the document object model associated with the response HTML from the web application 12, 14, 16, 18

FIG. 4

DETECTING VULNERABILITIES IN WEB APPLICATIONS

BACKGROUND OF THE INVENTION

Web applications may be vulnerable to exploitation. For example, a web application may include HyperText Markup Language (HTML) web pages that implement JavaScript to provide user interfaces for dynamic interaction. Portions of a document object model (DOM) of the HTML may come from an unreliable party. For instance, a malicious user may inject malicious data into a database associated with the web application through dynamic interaction with the web application. A benign user may then send a request to the web application and, in response to processing the request, the web application may inject the malicious data from the database into the response HTML sent back to the benign user. The benign user may now interact with the unsafe response HTML and cause JavaScript code to run, which may create vulnerability.

BRIEF SUMMARY OF THE INVENTION

In an embodiment, a method may include determining, via one or more computing devices, one or more values associated with a web application that flow to response data associated with the web application. The one or more values may be modifiable by unreliable input. The method may further include generating, via the one or more computing devices, a representation of the response data associated with the web application. The method may also include determining, via the one or more computing devices, one or more potentially vulnerable portions of the response data based upon, at least in part, the one or more values modifiable by the unreliable input that flow to the response data associated with the web application, and the representation of the response data associated with the web application. The method may additionally include transmitting an indication of the one or more potentially vulnerable portions of the response data to a user computing device configured to receive the response data.

One or more of the following features may be included. The one or more values modifiable by the unreliable input that flow to the response data associated with the web application may be determined via, at least in part, a taint analysis algorithm. The representation of the response data associated with the web application may be generated via, at least in part, a string analysis algorithm. The response data may correspond to response HTML associated with the web application. The representation of the response data associated with the web application may include any possible response HTML from the web application. The one or more potentially vulnerable portions of the response data may be one or more portions of a document object model associated with the response HTML that corresponds to the response data. The method may further include determining whether unreliable input has flown to the response HTML that corresponds to the response data and compromised security of the web application.

In an embodiment, a computer program product may reside on a computer readable storage medium and may have a plurality of instructions stored on it. When executed by a processor, the instructions may cause the processor to perform operations including determining, via one or more computing devices, one or more values associated with a web application that flow to response data associated with the web application. The one or more values may be modifiable by unreliable input. The operations may further include generating, via the one or more computing devices, a representation of the response data associated with the web application. The operations may also include determining, via the one or more computing devices, one or more potentially vulnerable portions of the response data based upon, at least in part, the one or more values modifiable by the unreliable input that flow to the response data associated with the web application, and the representation of the response data associated with the web application. The operations may additionally include transmitting an indication of the one or more potentially vulnerable portions of the response data to a user computing device configured to receive the response data.

One or more of the following features may be included. The one or more values modifiable by the unreliable input that flow to the response data associated with the web application may be determined via, at least in part, a taint analysis algorithm. The representation of the response data associated with the web application may be generated via, at least in part, a string analysis algorithm. The response data may correspond to response HTML associated with the web application. The representation of the response data associated with the web application may include any possible response HTML from the web application. The one or more potentially vulnerable portions of the response data may be one or more portions of a document object model associated with the response HTML that corresponds to the response data. The operations may further include determining whether unreliable input has flown to the response HTML that corresponds to the response data and compromised security of the web application.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to determine one or more values associated with a web application that flow to response data associated with the web application. The one or more values may be modifiable by unreliable input. Further, the computing system may include a second software module which may be configured generate a representation of the response data associated with the web application. Additionally, the computing system may include a third software module which may be configured to determine one or more potentially vulnerable portions of the response data based upon, at least in part, the one or more values modifiable by the unreliable input that flow to the response data associated with the web application, and the representation of the response data associated with the web application. Moreover, the computing system may include a fourth software module which may be configured to transmit an indication of the one or more potentially vulnerable portions of the response data to a user computing device configured to receive the response data.

One or more of the following features may be included. The one or more values modifiable by the unreliable input that flow to the response data associated with the web application may be determined via, at least in part, a taint analysis algorithm. The representation of the response data associated with the web application may be generated via, at least in part, a string analysis algorithm. The response data may correspond to response HTML associated with the web application. The representation of the response data associated with the web application may include any possible response HTML from the web application. The one or more potentially vulnerable portions of the response data may be one or more portions of a document object model associated with the response HTML that corresponds to the response data. The computing system may include a fifth software module which may be configured to determine whether unreliable input has flown to the response HTML that corresponds to the response data and compromised security of the web application.

In an embodiment, a method may include receiving, at a user computing device, an indication of one or more potentially vulnerable portions of a document object model associated with a response HTML from a web application. The indication based upon, at least in part, one or more values modifiable by unreliable input that flows to the response HTML and are determined, at least in part, by a first taint analysis algorithm. The indication may also be based upon, at least in part, a representation of the response HTML generated, at least in part, by a string analysis algorithm. The method may further include determining, via the user computing device, whether unreliable input has flown to the response HTML and compromised security of the web application by running a second taint analysis algorithm informed by the indication of one or more potentially vulnerable portions of the document object model associated with the response HTML from the web application.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 4 is a flowchart may be associated with the vulnerability detection process of FIG. 1.

DETAILED DESCRIPTION OF THE INVENTION

Figure 1:
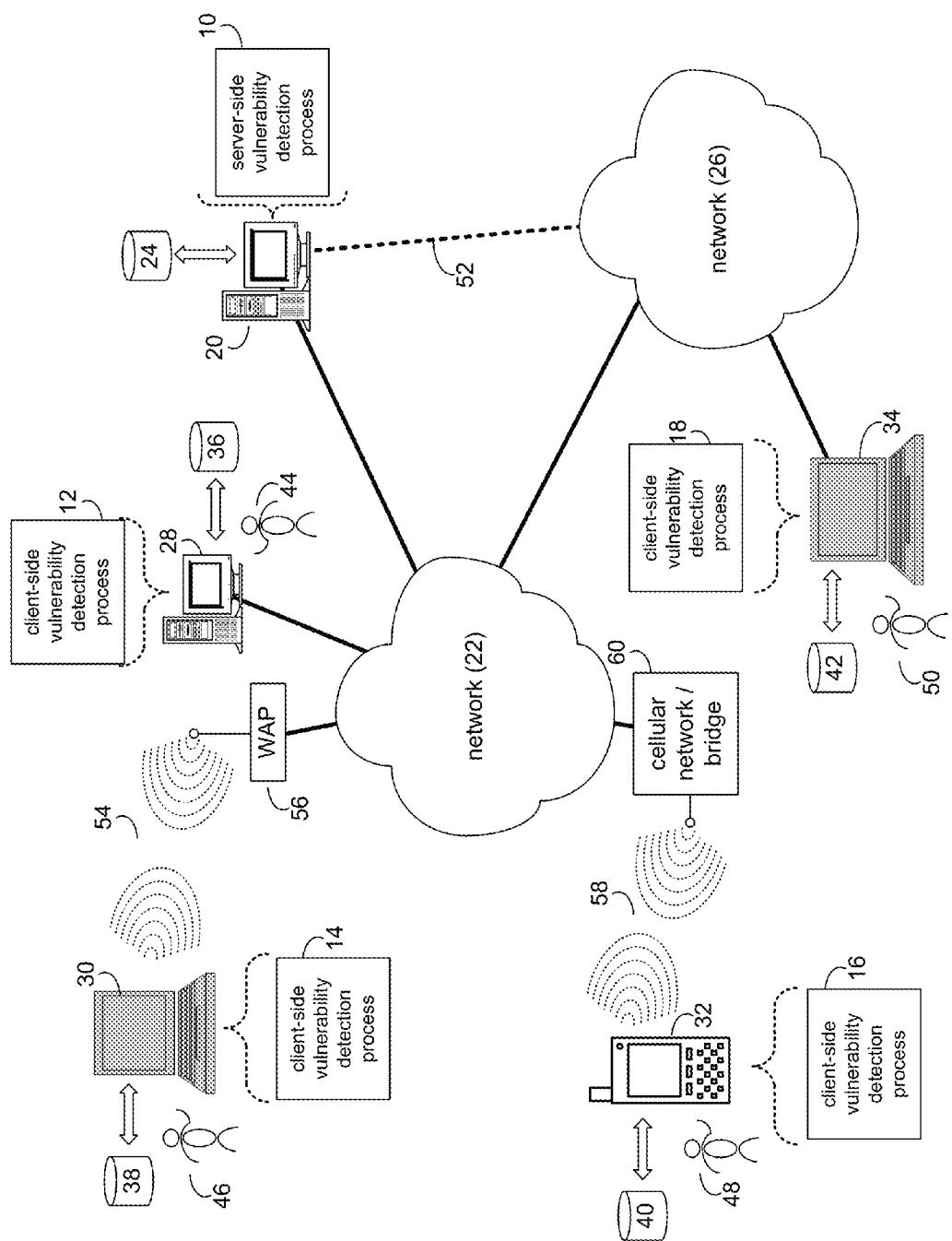
FIG. 1 is a diagrammatic view of a vulnerability detection process coupled to a distributed computing network.
Figure 2:
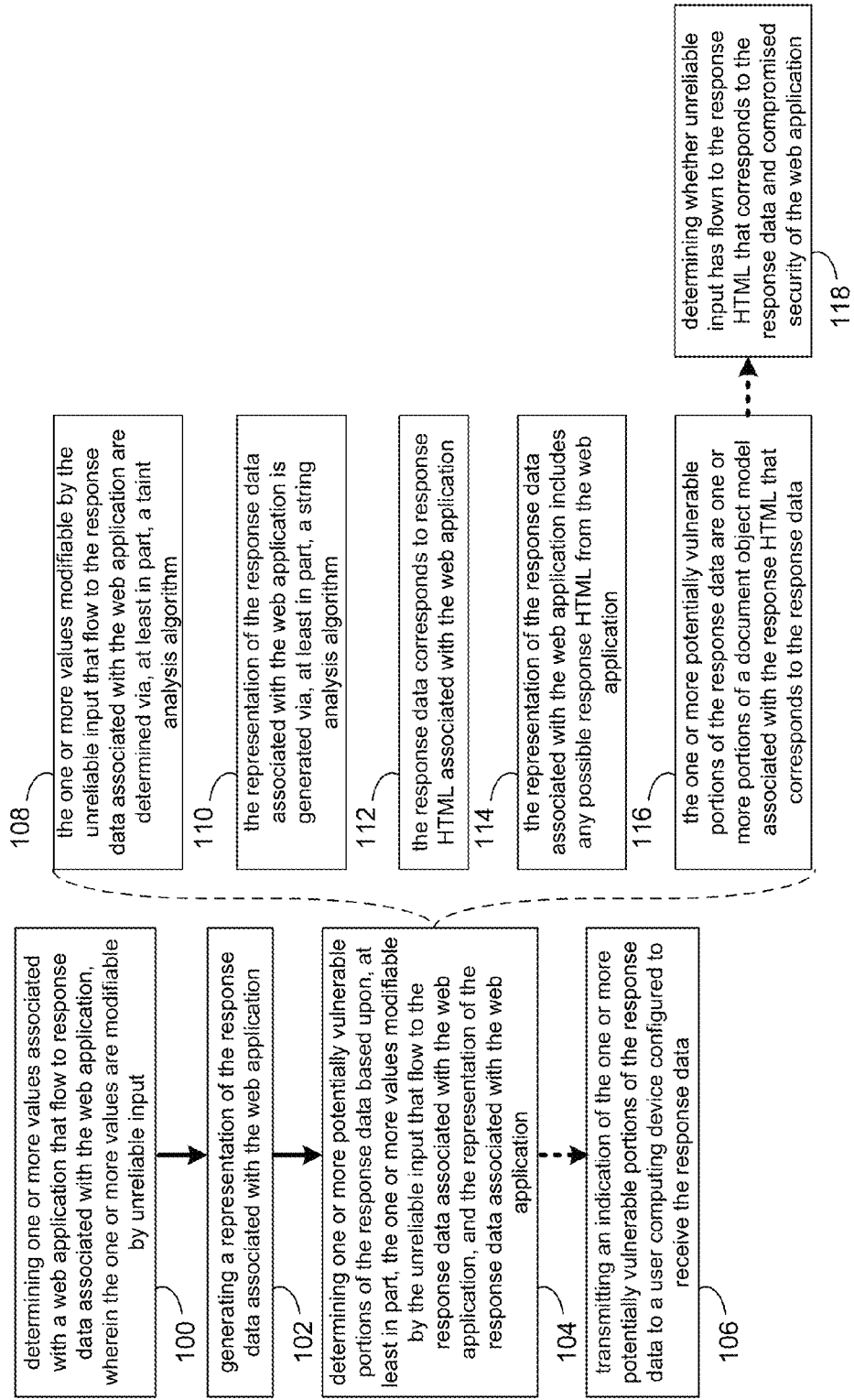
FIG. 2 is a flowchart of the vulnerability detection process of FIG. 1.

Referring to FIGS. 1 & 2, there is shown a vulnerability detection process 10. As will be discussed below, vulnerability detection process 10 may determine 100 one or more values associated with a web application that flow to response data associated with the web application. The one or more values may be modifiable by unreliable input. Vulnerability detection process 10 may also generate 102 a representation of the response data associated with the web application. Vulnerability detection process 10 may further determine 104 one or more potentially vulnerable portions of the response data based upon, at least in part, the one or more values modifiable by the unreliable input that flow to the response data associated with the web application, and the representation of the response data associated with the web application.

The vulnerability detection process may be a server-side process (e.g., server-side vulnerability detection process 10), a client-side process (e.g., client-side vulnerability detection process 12, client-side vulnerability detection process 14, client-side vulnerability detection process 16, or client-side vulnerability detection process 18), or a hybrid server-side/client-side process (e.g., the combination of server-side vulnerability detection process 10 and one or more of client-side vulnerability detection processes 12, 14, 16, 18).

Server-side vulnerability detection process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side vulnerability detection process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side vulnerability detection processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side vulnerability detection processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side vulnerability detection processes 12, 14, 16, 18 and/or server-side vulnerability detection process 10 may be processes that run within (i.e., are part of) an application security software (e.g., one or more software applications in the Rational® AppScan® Family). Alternatively, client-side vulnerability detection processes 12, 14, 16, 18 and/or server-side vulnerability detection process 10 may be stand-alone applications that work in conjunction with the application security software. One or more of client-side vulnerability detection processes 12, 14, 16, 18 and server-side vulnerability detection process 10 may interface with each other (via network 22 and/or network 26).

Users 44, 46, 48, 50 may access server-side vulnerability detection process 10 directly through the device on which the client-side vulnerability detection process (e.g., client-side vulnerability detection processes 12, 14, 16, 18) is executed, namely client electronic devices 28, 30, 32, 34, for example. Users 44, 46, 48, 50 may access server-side vulnerability detection process 10 directly through network 22 and/or through secondary network 26. Further, server computer 20 (i.e., the computer that executes server-side vulnerability detection process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Vulnerability Detection Process

For the following discussion, server-side vulnerability detection process 10 will be described for illustrative purposes. It should be noted that client-side vulnerability detection process 12 may interact with server-side vulnerability detection process 10 and may be executed within one or more applications that allow for communication with client-side vulnerability detection process 12. However, this is not intended to be a limitation of this disclosure, as other configurations are possible (e.g., stand-alone, client-side vulnerability detection processes and/or stand-alone server-side vulnerability detection processes.) For example, some implementations may include one or more of client-side vulnerability detection processes 12, 14, 16, 18 in place of or in addition to server-side vulnerability detection process 10.

Web applications may be increasingly sophisticated and may also be more vulnerable to exploitations. The exploitations may be difficult to find when malicious data flows into the server-side of the web application and is redirected to the client-side. This may occur if the malicious data is rendered into a document object model (DOM) of the response HTML associated with the web application. For example, if the server-side of the web application uses a template for the response HTML, the template may be instantiated using dynamic values coming from a malicious user as request parameters. These dynamic values may be the malicious data that is rendered into the document object model (DOM) of the response HTML associated with the web application.

A document object model (DOM) may be a convention for representing and interacting with objects in HTML, XHTML, and/or XML documents. DOM elements may be addressed and manipulated within the syntax of a programming language in use. The interface of a DOM may be specified in its application programming interface (API). In this way, the DOM may be an interface operable across different platforms and languages that may allow programs and/or scripts to dynamically access and update the content, structure and style of documents (e.g., HTML, XHTML, and/or XML documents). A document (e.g., an HTML, XHTML, and/or XML document) may be further processed and the results of that processing may be incorporated back into a page presented to a user. The DOM may be required by scripts to allow them to inspect or modify a web page dynamically. DOM-based vulnerabilities such as DOM-based cross-site scripting (XSS) may occur in content processing stages performed by a client, typically in client-side JavaScript. JavaScript programs may manipulate the state of a web page and may populate it with dynamically-computed data primarily by acting upon the DOM.

A scan or security analysis of the response HTML may not detect that one or more portions of the DOM reflect the malicious data coming from the malicious user. From a client-side analysis, the malicious data may be considered plain data residing in the DOM and may be indistinguishable from the rest of the DOM. From a server-side analysis, it may be too conservative or cumbersome to flag a security breach or other violation upon rendering a malicious value to the client-side DOM because it may not be clear whether that value will be used on the client-side in a malicious manner or security sensitive manner. For example, the malicious data or value may be a string that is viewable as flat text, but a benign user on the client-side may be able to trigger a client-side operation on it. By utilizing a static analysis of server-side code of the web application, DOM-based client-side vulnerabilities may be detected.

Figure 3:
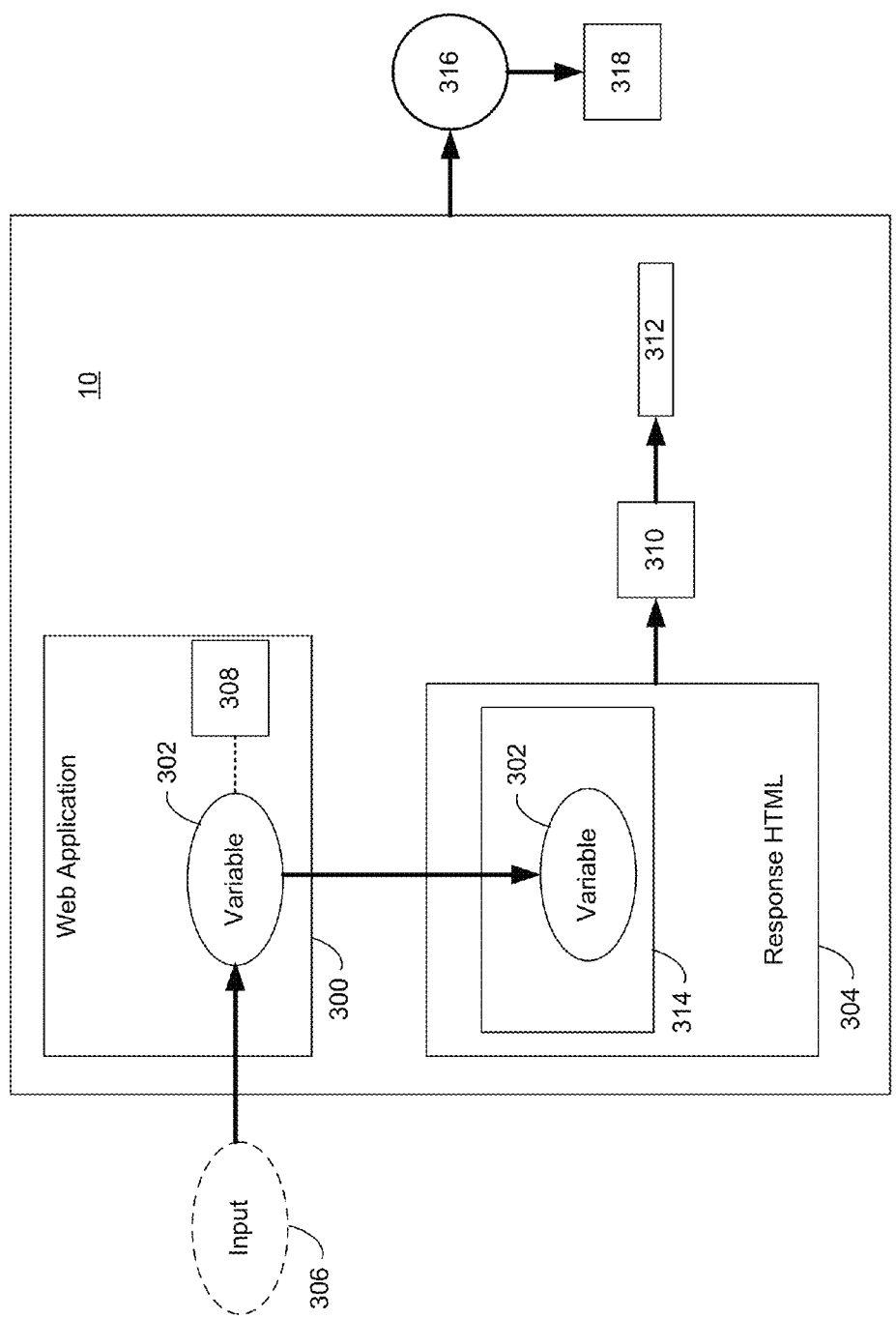
FIG. 3 is a diagrammatic flowchart which may be associated with the vulnerability detection process of FIG. 1.

Referring now to FIGS. 1-3, vulnerability detection process 10 may determine 100 one or more values (e.g., variable 302) associated with a web application (e.g., web application 300) that flow to response data (e.g., response HTML 304) associated with the web application (e.g., web application 300). The response data may (112) correspond to response HTML (e.g., response HTML 304) associated with the web application (e.g., web application 300). The one or more values (e.g., variable 302) may be modifiable by unreliable input (e.g., input 306). Web application 300 may be a server-side program or one or more server-side programs that makeup web application 300, including, but not limited to, a social media web application, a financial transaction web application, or any other web application that can receive input (e.g., input 306) from a user computing device.

The one or more determined values (e.g., variable 302) modifiable by the unreliable input (e.g., input 306) that flow to the response data (e.g., response HTML 304) associated with the web application (e.g., web application 300) may be (108) determined via, at least in part, a taint analysis algorithm (e.g., taint analysis algorithm 308). Taint analysis algorithm 308 may be part of a taint analysis operating on a server-side program (e.g., web application 300). Taint analysis algorithm 308 may track flow of unreliable data (e.g., input 306) into the response data (e.g., response HTML 304). For example, taint analysis algorithm 308 may track any variable or other value (e.g., variable 302) in web application 300 that is modifiable by user input (e.g., input 306) to determine whether or not the value (e.g., variable 302) flows into response data (e.g., response HTML 304) that may ultimately flow back to a computing device associated with a benign user. Since variable 302 may receive input 306 from either a benign user or a malicious user (via a computing device associated therewith) taint analysis algorithm 308 tracks all such values that may flow into response HTML 304.

A taint analysis may be a form of information-flow analysis, and may establish whether values from untrusted methods and/or parameters may flow into security-sensitive operations or applications. Taint analysis may detect many common vulnerabilities in web applications. For example, a static taint analysis for Java (TAJ) as developed by IBM® may analyze applications of virtually any size and may employ a set of techniques designed to produce useful answers given limited time and space. TAJ may address a wide variety of attack vectors, with techniques that may handle reflective calls, flow through containers, and nested taint. The taint analysis may track data-flow paths seeded by untrusted values, such as a value defined by a statement reading a request parameter. Further, the taint analysis may check whether there are paths reaching a statement that renders data to the response HTML. For such paths, the value flowing into the response HTML may be marked as untrusted.

Further, vulnerability detection process 10 may generate 102 a representation (e.g., representation 312) of the response data (e.g., response HTML 304) associated with the web application (e.g., web application 300). Representation 312 may be a model of a client-side program associated with web application 300. Representation 312 may also be a conservative model of client-side HTML associated with web application 300. Further, representation 312 may be an abstract representation of response HTML 304 and all possible response HTMLs may be embeddable in the abstract representation. For example, representation 312 may be a static approximation of one or more dynamically generated web pages (e.g., associated with web application 300)

The representation (e.g., representation 312) of the response data (e.g., response HTML 304) associated with the web application (e.g., web application 300) may be (110) generated via, at least in part, a string analysis algorithm (e.g., string analysis algorithm 310). String analysis algorithm 310 may be part of a static program analysis that may approximate the string output of a program with a context-free grammar. The approximation obtained by such an analyzer may be used to check various properties of a server-side program (e.g., web application 300) and the pages it may generate (e.g., web pages associated with response HTML 304).

Static program analysis may be applied to static checking of properties of web pages that may be generated dynamically by a server-side program and may approximate the string output of a program with a context-free grammar. The approximation obtained by the analysis may be conservative in the sense that it may include any possible output string that may be generated by the program. In this way, the representation (e.g., representation 312) of the response data (e.g., response HTML 304) associated with the web application (e.g., web application 300) may (114) include any possible response HTML (e.g., response HTML 304) from the web application (e.g., web application 300). By applying this type of static program analysis/string analysis to a server-side program, dynamically generated web pages from the server-side program may also be approximated with a context-free grammar. The approximation obtained by such an analysis may be used to check the validity and security of a server-side program.

For example, the string analysis may track the construction of the response HTML and approximate the structure of the response HTML. An abstract representation produced by the string analysis may be a regular expression, a context-free grammar, or a logical formula. The abstract representation may subsume all the concrete HTMLs that may be generated by the web application in response to a client-side request.

Additionally, vulnerability detection process 10 may determine 104 one or more potentially vulnerable portions (e.g., portion 314) of the response data (e.g., response HTML 304) based upon, at least in part, the one or more values (e.g., variable 302) modifiable by the unreliable input (e.g., input 306) that may flow to the response data (e.g., response HTML 304) associated with the web application (e.g., web application 300), and the representation (e.g., representation 312) of the response data (e.g., response HTML 304) associated with the web application (e.g., web application 300). The one or more potentially vulnerable portions (e.g., portion 314) of the response data (e.g., response HTML 304) may be (116) one or more portions (e.g., portion 314) of a document object model (DOM) associated with the response HTML (e.g., response HTML 304) that corresponds to the response data. Vulnerability detection process 10 may localize portion 314 of response HTML 304 because portion 314 includes variable 302 that may be modifiable by unreliable input (e.g., input 306). Portion 314 may be a portion of the DOM associated with response HTML 304.

One or more of vulnerability detection process 10 and/or vulnerability detection processes 12, 14, 16, and/or 18, or a combination of vulnerability detection process 10 and one or more of vulnerability detection processes 12, 14, 16, and/or 18 may determine 118 whether unreliable input (e.g., input 306) has flown to the response HTML (e.g., response HTML 304) that corresponds to the response data and compromised security of the web application (e.g., web application 300). In an implementation, vulnerability detection process 10 may transmit 106 an indication (e.g., indication 316) of the one or more potentially vulnerable portions (e.g., portion 314) of the response data (e.g., response HTML 304) to a user computing device (e.g., one or more of client electronic devices 28, 30, 32, 34) which may be configured to receive the response data (e.g., response HTML 304).

Referring now also to FIG. 4, one or more of vulnerability detection processes 12, 14, 16, and/or 18 may receive 400 an indication (e.g., indication 316) of one or more potentially vulnerable portions (e.g., portion 314) of a document object model associated with a response HTML (e.g., response HTML 304) from a web application (e.g., web application 300). The indication (e.g., indication 316) may be based upon, at least in part, one or more values (e.g., variable 302) modifiable by unreliable input (e.g., input 306) that may flow to the response HTML (e.g., response HTML 304). The one or more values (e.g., variable 302) modifiable by unreliable input (e.g., input 306) may be determined, at least in part, by a first taint analysis algorithm (e.g., taint analysis algorithm 307). The indication (e.g., indication 316) may also be based upon, at least in part a representation (e.g., representation 312) of the response HTML (e.g., response HTML 304) generated, at least in part, by a string analysis algorithm (e.g., string analysis algorithm 310). In an implementation, indication 316 may provide one or more of vulnerability detection processes 12, 14, 16, and/or 18 with knowledge that variable 302 may be modifiable by unreliable input (e.g., input 306) that may flow to response HTML 304. Further, in an implementation, indication 316 may provide one or more of vulnerability detection processes 12, 14, 16, and/or 18 with representation 312 of response HTML 304, or data associated therewith.

Further, one or more of vulnerability detection processes 12, 14, 16, and/or 18 may determine 402 whether unreliable input (e.g., input 306) has flown to the response HTML (e.g., response HTML 304) and compromised security of the web application (e.g., web application 300) by running a second taint analysis algorithm (e.g., taint analysis algorithm 318) informed by the indication (e.g., indication 316) of one or more potentially vulnerable portions (e.g., portion 314) of the document object model associated with the response HTML (e.g., response HTML 304) from the web application (e.g., web application 300). The second taint analysis algorithm (e.g., taint analysis algorithm 318) may be a client-side taint analysis which may operate on the model and/or representation (e.g., representation 312) generated by the string analysis algorithm (e.g., string analysis algorithm 310). In this way, the second taint analysis (performed with, e.g., taint analysis algorithm 318) is informed by the first taint analysis (performed with, e.g., taint analysis algorithm 308) and the string analysis (performed with, e.g., string analysis algorithm 310) in order to uncover client-side vulnerabilities.

For example, an abstract representation that resulted from the first taint analysis (performed with, e.g., taint analysis algorithm 318) may be analyzed as a conservative approximation of a client-side program. The first taint analysis may be considered a server-side taint analysis and the second taint analysis may be considered a client-side taint analysis. The client-side taint analysis may operate on a different language, such as JavaScript or ActionScript, than the server-side taint analysis, which may run on Java or PHP code), and may use different rules. The client-side taint analysis may run on an abstract representation of the JavaScript program, which may render its results more conservative. For example, if certain parts if the client-side program are modeled coarsely due to limitations on the part of the server-side string analysis the results may be the worst-case assumptions by the client-side security analysis. The client-side security analysis may be seeded by areas in the abstract client-side program that access the DOM and read values off it that may be marked as untrusted by the server-side taint analysis.

Figure 5:
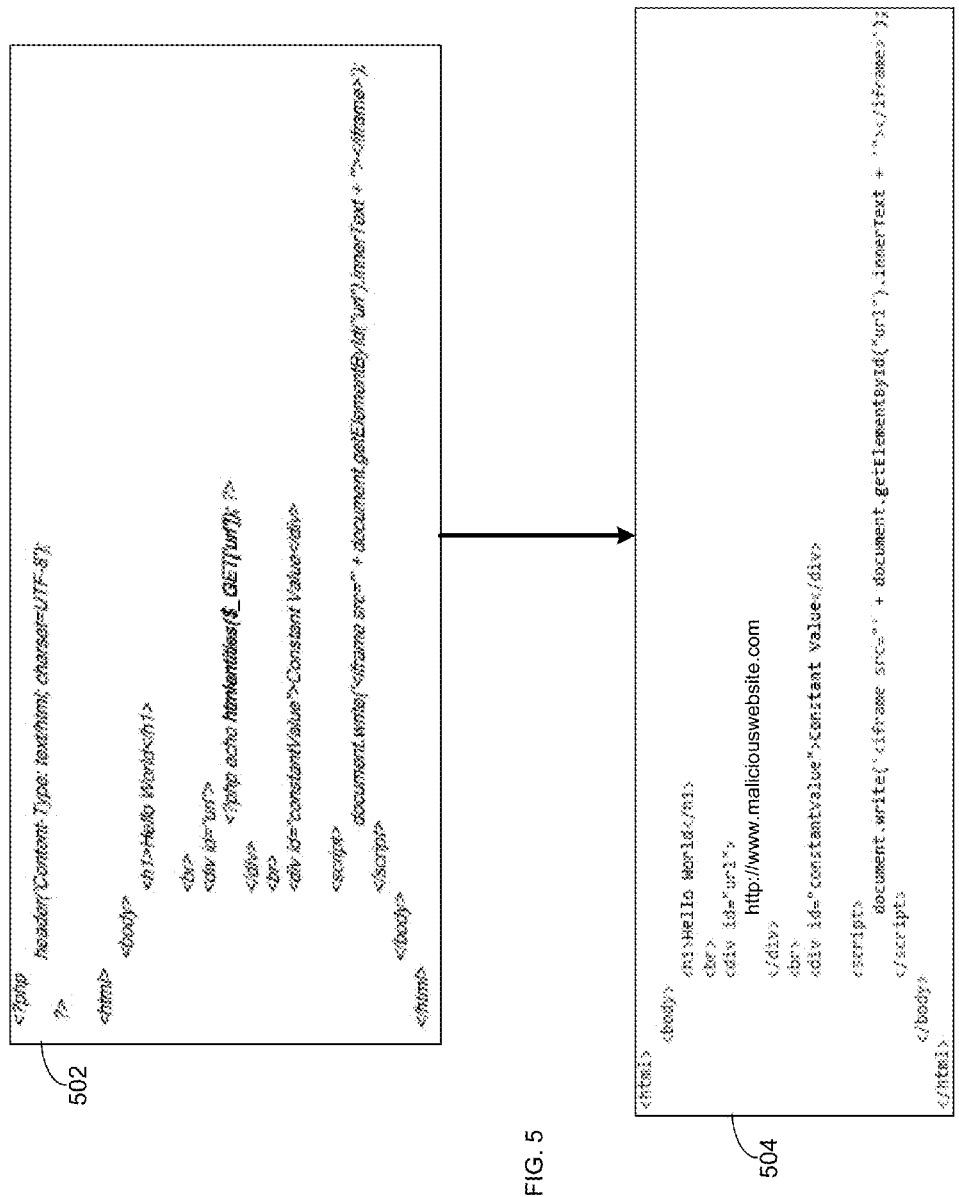
FIG. 5 is also is a diagrammatic flowchart which may be associated with the vulnerability detection process of FIG. 1.

Referring now also to FIG. 5, a server-side PHP program (e.g., program 502) is shown. Program 502 may be one or more programs that are part of web application 300. PHP may be a general purpose server-side scripting language for producing dynamic web pages. PHP script may be embedded into an HTML source document and may be interpreted by a web server with a PHP processor module. A response HTML from loading a script (e.g., by loading http://SERVER/IndirectDOMXSS.php?url=http://www.maliciouswebsite.com) may be shown in response HTML 504. As shown in response HTML 504, a URL value (e.g., http://www.maliciouswebsite.com) may be input by a malicious user and if a script including the URL value is loaded, a malicious URL may be reflected in the response HTML (e.g., response HTML 504).

The PHP script may employ cross-site scripting counter measures. For example, "htmlentities" as shown in program 502 may be a sanitizer which transforms dangerous characters such as "<" and ">" into their HTML-encoded representation. Further, the PHP script may enforce a concrete character set for the response HTML. However, the vulnerability shown in program 502 may not be identified using these cross-site scripting counter measures. Further, by evaluating the response HTML via a pure client-side JavaScript taint analysis, program 502 may not be identified as vulnerable. For example, the client-side analysis may not discover that the "URL" div DOM element is tainted. Additionally, by employing a pure server-side static analysis, discovered vulnerabilities may often be false positives because more often that not it may be that there would not be any client-side JavaScript reading the tainted value and processing it in a vulnerable way. Moreover, the pure server-side static analysis may not localize the vulnerability even when it is a false positive. This may require substantial effort by a security analyst to determine where the vulnerability actually is.

As discussed above, by performing JavaScript static analysis while being informed of the relevant DOM-read operation using one or more of the methods, features, and techniques discussed herein, the reflected taint may be received from the server and the vulnerability may be identified. While the server-side taint analysis may discover a tainted value (e.g., variable 302) that flows into the response HTML (e.g., response HTML 304), the string analysis is also used to build a representation (e.g., representation 312) of the resulting HTML, which may be an abstract model of the HTML. In the abstract model of the HTML, the JavaScript program may be likely to be represented explicitly, as it may typically be imported as a static resource. A client-side taint analysis may scan the HTML approximation with the concrete JavaScript program residing in it. The client-side taint analysis may further interpret the DOM-element read operation inside it, which may retrieve the "URL" DOM element. The client-side taint analysis may scan the HTML approximation as a security source based on the information from the server-side taint analysis. This may yield a static solution for the problem of detecting client-side vulnerabilities such as indirect DOM-based cross-site scripting.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer readable storage medium having a plurality of instructions stored thereon, which, when executed by a processor, cause the processor to perform operations comprising:
   determining, via one or more computing devices, one or more values associated with a web application that flow to response data associated with the web application, wherein the one or more values are modifiable by unreliable input, wherein the one or more values modifiable by the unreliable input that flow to the response data associated with the web application are determined via, at least in part, a server-side taint analysis algorithm;
   determining whether there is a path reaching a statement that renders data to the response data;
   marking a value of the one or more values flowing into the response data as untrusted in response to determining that there is a path reaching the statement that renders data to the response data;
   generating, via the one or more computing devices, an abstract representation of the response data associated with the web application generated via, at least in part, a string analysis algorithm that approximates at least one of a string output of the response data associated with the web application with a context-free grammar and a logical formula; and
   determining, via the one or more computing devices, one or more potentially vulnerable portions of the response data based upon, at least in part, the one or more values modifiable by the unreliable input that flow to the response data associated with the web application, the abstract representation of the response data associated with the web application, and a taint analysis algorithm operating on the abstract representation of the response data.

2. The computer program product of claim 1, wherein the operations further comprise:
   transmitting an indication of the one or more potentially vulnerable portions of the response data to a user computing device configured to receive the response data.

3. The computer program product of claim 1, wherein the representation of the response data associated with the web application is generated via, at least in part, a string analysis algorithm.

4. The computer program product of claim 1, wherein the response data corresponds to response HTML associated with the web application.

5. The computer program product of claim 4, wherein the representation of the response data associated with the web application includes any possible response HTML from the web application.

6. The computer program product of claim 4, wherein the one or more potentially vulnerable portions of the response data are one or more portions of a document object model associated with the response HTML that corresponds to the response data.

7. The computer program product of claim 6, wherein the operations further comprise:
determining whether unreliable input has flown to the response HTML that corresponds to the response data and compromised security of the web application.

8. A computing system comprising:
at least one processor;
at least one memory architecture coupled with the at least one processor;
a first software module executable by the at least one processor and the at least one memory architecture, wherein the first software module is configured to determine one or more values associated with a web application that flow to response data associated with the web application, wherein the one or more values are modifiable by unreliable input, wherein the one or more values modifiable by the unreliable input that flow to the response data associated with the web application are determined via, at least in part, a server-side taint analysis algorithm;
wherein the first software module is further configured to determine whether there is a path reaching a statement that renders data to the response data, and further configured to mark a value of the one or more values flowing into the response data as untrusted in response to determining that there is a path reaching the statement that renders data to the response data;
a second software module executable by the at least one processor and the at least one memory architecture, wherein the second software module is configured to generate an abstract representation of the response data associated with the web application generated via, at least in part, a string analysis algorithm that approximates at least one of a string output of the response data associated with the web application with a context-free grammar and a logical formula; and a third software module executable by the at least one processor and the at least one memory architecture, wherein the third software module is configured to determine one or more potentially vulnerable portions of the response data based upon, at least in part, the one or more values modifiable by the unreliable input that flow to the response data associated with the web application, the abstract representation of the response data associated with the web application, and a taint analysis algorithm operating on the abstract representation of the response data.

9. The computing system of claim 8, further comprising:
a fourth software module executable by the at least one processor and the at least one memory architecture, wherein the fourth software module is configured to transmit an indication of the one or more potentially vulnerable portions of the response data to a user computing device configured to receive the response data.

10. The computing system of claim 8, wherein the representation of the response data associated with the web application is generated via, at least in part, a string analysis algorithm.

11. The computing system of claim 8, wherein the response data corresponds to response HTML associated with the web application.

12. The computing system of claim 11, wherein the representation of the response data associated with the web application includes any possible response HTML from the web application.

13. The computing system of claim 11, wherein the one or more potentially vulnerable portions of the response data are one or more portions of a document object model associated with the response HTML that corresponds to the response data.

14. The computing system of claim 13, further comprising:
a fifth software module executable by the at least one processor and the at least one memory architecture, wherein the fifth software module is configured to determine whether unreliable input has flown to the response HTML that corresponds to the response data and compromised security of the web application.

* * * * *